Figure 1:
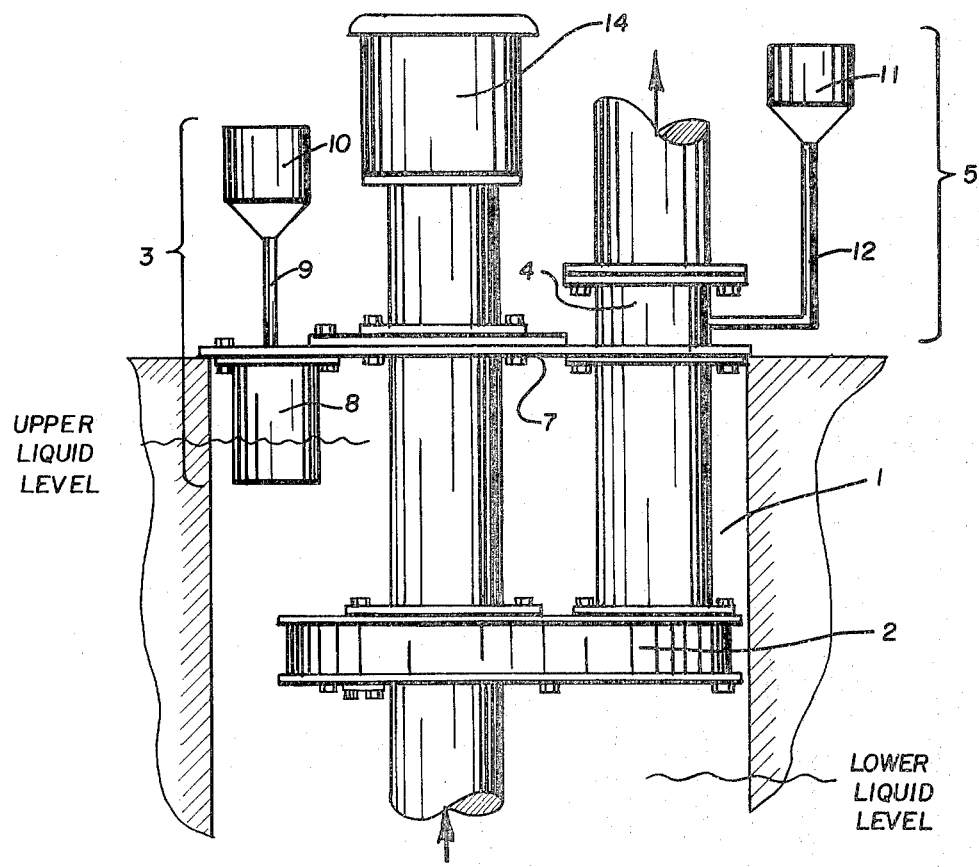

United States Patent [19]
Emeny

[11] 3,829,241
[45] Aug. 13, 1974

[54] LIQUID LEVEL CONTROL
[76] Inventor: George B. Emeny, 575 Highland Ave., Salem, Ohio 44460
[22] Filed: Aug. 25, 1972
[21] Appl. No.: 283,750

[52] U.S. Cl................................... 417/17, 417/25
[51] Int. Cl........................................... F04b 49/00
[58] Field of Search............. 417/17, 36, 44, 25, 38

[56] References Cited
UNITED STATES PATENTS
| | | | |
|---|---|---|---|
| 1,913,557 | 6/1933 | Millar | 417/25 |
| 2,488,506 | 11/1949 | Bernhardt | 417/424 |
| 2,732,804 | 1/1956 | Sadler et al. | 417/44 |
| 3,070,021 | 12/1962 | Tutthill | 417/38 |
| 3,132,592 | 5/1964 | Rudy et al. | 417/17 |
| 3,457,865 | 7/1969 | Dunlap | 417/36 |
| 3,469,528 | 9/1969 | East | 417/17 |
| 3,717,421 | 2/1973 | Schaefer | 417/38 |

Primary Examiner—William L. Freeh
Attorney, Agent, or Firm—Webb, Burden, Robinson & Webb

[57] ABSTRACT

A liquid level control for the operation of a sump pump or the like intermittently removing liquid from a sump or pit. The control starts the pump when the liquid level reaches a preset high level which pumps until the liquid reaches a preset low level. The control comprises a first switch which closes in response to the liquid crossing the preset upper level and a second switch preferably in parallel therewith which closes in response to the liquid moving through the pump such that when the first switch starts the pump, the second switch maintains the pump in the on position.

1 Claim, 2 Drawing Figures

LIQUID LEVEL CONTROL

This invention relates to a liquid level control and more particularly to a device for the activation of a sump pump when the liquid in a sump or pit reaches a predetermined high liquid level and for the deactivation of the sump pump when the liquid reaches a predetermined low level.

In deep sumps or pits conventional methods of pump control may be cumbersome or unreliable. Since a float control usually involves a float which is guided by some means submerged in the sump or pit, corrosion of these parts or the adherence of foreign substances to these parts may cause the float to stick or bind. Further, floats can be disturbed by high liquid turbulence in the sump. Finally, a mechanical failure such as loss of retaining collars can also cause float controls to become inoperative. Electric control is also subject to the difficulties inherent in having a portion of the control mechanism extend below the liquid level, for example, the electrodes may become fouled because of a sludge coating or corrosion of the electrodes. Bulbs submerged below the liquid level to transmit pressure control to the control switch are also subjected to deterioration. Even mechanical elements above the liquid level can be troublesome. For example, chain supports of floats require guide members which are subject to corrosion and binding or breakage.

It is an advantage according to this invention that the problems inherent in the prior liquid level control systems and especially those which have control elements below the liquid level are overcome.

Briefly, according to this invention, the liquid level control comprises a switch for activating the pump when the upper liquid level is reached. Numerous such switches are available which are not submerged below the upper liquid level. Further, a second switch is provided which is responsive to the pressure in the pump discharge pipe for maintaining the pump activated after it has been first started by the upper liquid level switch. The second switch maintains the pump activated until the pressure in the discharge pipe falls due to the decrease in liquid level. In other words, the second switch maintains the pump activated until the pressure in the discharge pipe is reduced below a selected discharge pressure. The discharge pressure decreases to the selected pressure as the liquid level in the sump is lowered due to the greater height (head) through which the pump must raise the liquid. The discharge pressure may be reduced to approximately atmospheric pressure if the pump lowers the liquid in the sump sufficiently to enable the pump to draw air into the suction pipe.

Figure 2:
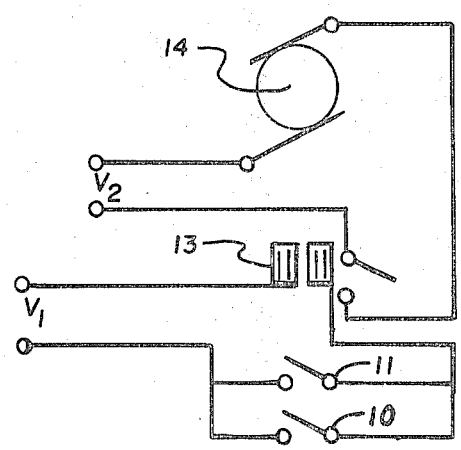

Further features and other objects and advantages of this invention will become clear to those skilled in the art from the following detailed description made with reference to the drawings in which:

FIG. 1 is a schematic drawing of one embodiment of the mechanical positioning of the switches for the control according to this invention; and, FIG. 2 is a schematic drawing of one embodiment of the electrical system according to this invention.

Referring to FIG. 1, a sump 1 is arranged to accumulate liquid in the bottom thereof. A pump 2 is arranged to remove liquid from the sump until a lower liquid level is reached. An upper liquid level sensing control 3 is arranged substantially above the upper liquid level. This control and the pump may be mounted in a sump cover plate 7. The pump is provided with a discharge pipe 4. Connected to the discharge pipe is a pressure sensitive control 5 for maintaining the pump activated when there exists sufficient pressure in the discharge pipe 4. Pump 2 may be any type of pump controllable by electrical means, for example, motor 14, wherein the pumping chamber 2 may be located above or below the liquid level in the pit.

Upper liquid level control 3 may be of any type to sense the upper liquid level and to thereby activate the pump motor either directly or through a relay switch or starter. Preferably, according to this invention, a pressure sensitive switch 10 is activated as the liquid rises in a tube 8 compressing the entrapped air therein. The tube must be of sufficient size so as not to be easily clogged. The top of the tube is, of course, enclosed except for the conduit in communication with the switch 10. The rise of liquid in the tube compresses the trapped air sufficiently within a few inches of the bottom of the tube to activate the switch. Switches are commercially available, for example, which may close at less than 1 psi in excess of atmospheric pressure and open again at a fraction of 1 psi above atmospheric pressure. The length of the pressure tube should be determined by the location of the high liquid level and the sensitivity and pressure activating range of the switch. This combination of factors can be applied to cause an activation of the switch when the liquid has risen only a few inches into the tube 8. Hence, only the lower several inches of the tube are susceptible to corrosion by the liquid contained in the sump.

A starting switch is satisfactory if compression of the air in its compression tube will cause the switch to close at the desired high liquid level and open by the time the liquid level is lower than the bottom of the pressure tube and also if the highest acceptable low liquid level is lower than the bottom of the starting switch compression tube.

The control 5 for maintaining the pump activated has a pressure sensitive switch 11 similar to the pressure sensitive switch 10 except that it is designed to operate in a pressure range somewhat less than the discharge pressure generated by the pump. As soon as the pump starts, it develops pressure in its discharge pipe 4 which is transmitted to the switch 11 through a connecting pressure tube 12. The switch may be set so that at a predetermined pressure lower than the closing pressure it becomes deactivated thus deactivating the pump. Hence, as the pump empties the liquid level in the pit, the pressure in the discharge pipe decreases allowing the switch 11 to deactivate. The deactivation pressure may be any desired and even the point when the pump loses its prime and fails to pump. It has been found that a switch is satisfactory which closes at a pressure somewhat less than the initial discharge pressure and opens at a pressure no lower than that corresponding to the lower liquid level.

Referring to FIG. 2, the electrical system may comprise the starting switch 10 arranged in parallel with the maintaining switch 11 to connect an electrical power source $V_1$ to a relay 13. The relay when closed connects an electrical power source $V_2$ to the pump motor 14. Other electrical circuits may be arranged to provide the same function, for example, the starting switch and the maintaining switch may be arranged to close relay switches which are themselves arranged in parallel between the voltage $V_2$ and the motor 14.

In operation, when the desired top liquid level is reached, the control switch 10 closes its contact and activates the pump starter which starts the pump and generates pressure in the discharge pipe 4. Before the liquid level in the pit recedes below the point where the control switch 10 opens its contacts, the discharge pressure closes the contacts of control switch 11. Thus, switch 11 continues the activation of the pump until it is deactivated by the decrease in discharge pressure resulting from the falling of the liquid level.

In this application, the word sump can mean any vented tank, pit or other reservoir for holding liquid to be transferred by pumping or valving means or otherwise having its liquid level controlled between predetermined limits.

Having thus defined my invention in detail and with the particularity required by the Patent Laws, what is desired protected by Letters Patent is set forth in the following claim.

I claim:

1. A liquid level control for activating a pump when the liquid reaches an upper level and for deactivating a pump when the liquid reaches a lower level comprising:

means responsive to the liquid level for controlling a first switch in a relay power supply circuit such that the switch closes when the upper liquid level is reached and remains closed until the liquid level recedes below the upper liquid level, said switch means comprising an inverted conduit enclosed at the upper end and extending below the upper liquid level but not below the lower liquid level;

means above the upper liquid level responsive to the pressure in the pump's discharge pipe for controlling a second switch in said relay supply circuit such that the switch closes when the pump begins to force liquid into the discharge pipe and remains closed until the pressure in the discharge pipe falls at the lower level, said first and second switches being connected in parallel, said relay switch controlling the electrical power to said pump whereby the first switch activates the relay and the pump, at least for a time sufficient to raise the pressure in the discahrge pipe to activate the second switch and the relay and the second switch maintains the relay closed until the pressure in the discharge pipe lowers due to the decrease in the liquid level.

* * * * *